United States Patent [19]
Kohler et al.

[11] Patent Number: 5,775,603
[45] Date of Patent: *Jul. 7, 1998

[54] LOW PRESSURE ULTRA-HIGH ENERGY CRYOGENIC IMPACT SYSTEM

[75] Inventors: Rudolph Hugo Kohler, Danbury, Conn.; Robert Bruce Davis, Nyack; Frederic Neal Steigman, Ossining, both of N.Y.

[73] Assignee: Praxair Technology, Inc., Danbury, Conn.

[ * ] Notice: The term of this patent shall not extend beyond the expiration date of Pat. No. 5,597,123.

[21] Appl. No.: 780,085

[22] Filed: Dec. 23, 1996

Related U.S. Application Data

[63] Continuation-in-part of Ser. No. 497,654, Jun. 30, 1995, Pat. No. 5,597,123.
[51] Int. Cl.⁶ .................. B02C 19/00; B02C 19/12
[52] U.S. Cl. .................. 241/23; 241/65; 241/DIG. 14; 241/DIG. 37
[58] Field of Search .............. 241/23, 65, DIG. 14, 241/DIG. 31, DIG. 37

[56] References Cited

U.S. PATENT DOCUMENTS

| | | | |
|---|---|---|---|
| 4,102,503 | 7/1978 | Meinass | 241/18 |
| 4,340,076 | 7/1982 | Weitzen | 137/13 |
| 4,645,131 | 2/1987 | Hailey | 241/23 |
| 5,011,087 | 4/1991 | Richardson et al. | 241/5 |
| 5,375,775 | 12/1994 | Keller et al. | 241/19 |
| 5,597,123 | 1/1997 | Steigman et al. | 241/23 |

*Primary Examiner*—John M. Husar
*Attorney, Agent, or Firm*—Stanley Ktorides

[57] ABSTRACT

The present invention relates to an ultra-high energy impact system for reducing the particle size of materials to an average diameter as small as about 40 μm. The system includes a cooling station for cooling the materials to a temperature within the range of from about –40° F. to about –450° F. by direct contact with refrigerant, preferably liquid refrigerant; a milling station for reducing the particle size of the cooled materials which does not require direct cooling by refrigerant and which includes a rotor or rotors each operating at a tip speed within the range of from about 500 to about 1500 feet per second; and an atmosphere modifier for reducing the pressure of the gaseous atmosphere within the milling station to less than 20 inches of mercury absolute.

10 Claims, 1 Drawing Sheet

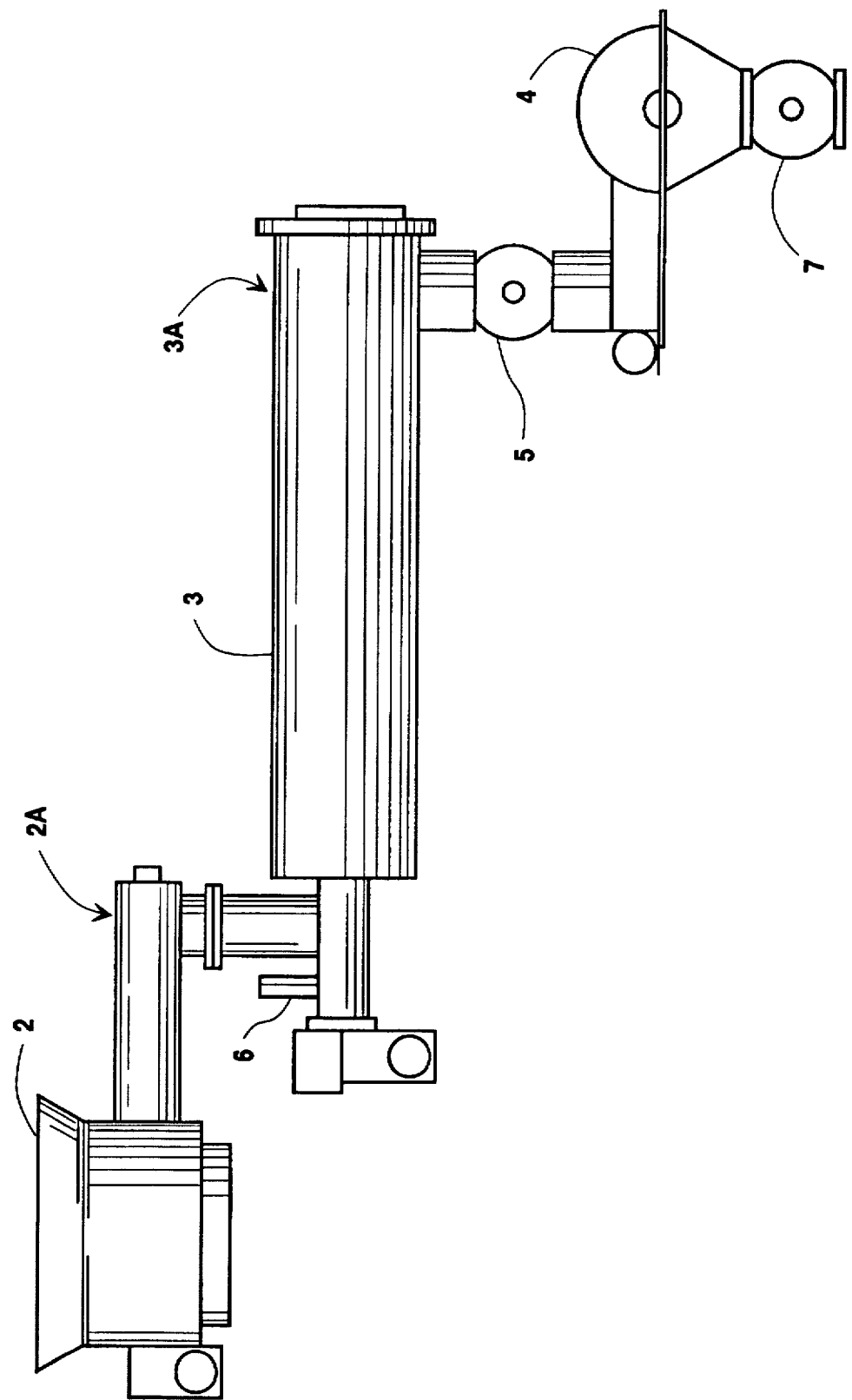

LOW PRESSURE ULTRA-HIGH ENERGY CRYOGENIC IMPACT SYSTEM

This is a Continuation-in-Part of prior U.S. application Ser. No. 08/497,654 filing date Jun. 30, 1995 now U.S. Pat. No. 5,597,123.

FIELD OF THE INVENTION

This invention relates to an ultra-high impact system in which a milling operation is carried out at a reduced temperature and pressure. More particularly, this invention relates to such system in which the milling operation is carried out at a cryogenic temperature.

BACKGROUND OF THE INVENTION

Landfill shortages have made it increasingly more desirable to recycle materials heretofore disposed in landfills. For example, rubber tires and many plastic items are now being recycled for many new uses. One such use involves milling the recycled rubber or plastic, and mixing the resulting ground product with materials for paving roads.

In conventional milling operations, including cryogenic milling operations, a rotor is used to provide the velocity or impact energy necessary to fracture the materials along microcracks or dislocations therein. For instance, rubber tire particles may be milled in a typical cryogenic hammermill to a ground rubber product, all of which is smaller than 30 U.S. mesh and 40% of which is smaller than 80 U.S. mesh. In order to achieve still smaller particle sizes, it is ordinarily necessary to increase the speed of the rotor within the mill so as to increase the impact energy imparted to the rubber particles. However, prior attempts to further reduce the particle size of material smaller than 30 U.S. mesh have resulted in lower throughput (i.e., pounds of material per hour through the mill) and in significantly higher consumption of the coolant, which is used to lower the temperature of the tire rubber particles to cryogenic levels. Often, multiple passes and additional cooling between each pass is required.

In addition, the particle dislocations, which provide fracture sites and lead to brittle fracturing at relatively low impact velocities, such as less than about 400 feet per second (FPS), are often depleted at such a mesh size. Thus, further particle size reduction through the mechanism of brittle fracture requires greater rotor speeds to generate higher impact velocities. However, the speed at which the rotor moves is constrained by limitations of the material from which the rotor is constructed and the geometry or design of the rotor itself. For instance, at tip speeds approaching 600 to 800 FPS, conventional rotors will tend to shatter, and the bearings and seals used in connection with the rotor will tend to be destroyed.

A significant increase in rotor speed also causes increased windage or aerodynamic drag, leading to inefficiencies in the operation. More specifically, the increased windage reduces the power available to conduct the milling operation. For example, about 85 to 90% of the operating power of a mill whose rotor tip speed is about 500 FPS is consumed by windage.

Drag and friction created during operation of such mills also cause an increase in the temperature of the rotor and the temperature of the materials being milled. These temperature increases adversely affect the efficiency of the milling operation and the integrity of the milled materials and often require injection of refrigerant directly into the mill.

It is known generally that, in high speed electrical machines having large diameter rotors, the inefficiencies caused by friction in air may be reduced by about 85 to 93% by conducting the operation in a hydrogen environment.

U.S. Pat. No. 4,645,131 discloses a powder mill which uses a vacuum to reduce the drag on metal powders. The powder mill of the '131 patent is said to mill the metal powders, which are cooled to a low temperature such as −100° F., to a particle size of smaller than 20 μm (625 U.S. mesh). The vacuum is reportedly used to reduce drag on the milled metal powders in an attempt to minimize interference with the milling operation, as particles of that size have little mass and the drag created under ambient conditions would tend to suspend the particles. In addition, the vacuum is used to combat the problem of metal oxidation, which occurs under atmospheric conditions and which becomes more pronounced as particle size decreases (and particle surface area increases).

One known mill, which was developed for heat-sensitive materials, is the Victory Mill, commercially available from Hosokawa Micron, Summit, N.J. This Hosokawa mill operates by impact pulverization, and is designed for coarse-to-medium size reduction of heat-sensitive materials (e.g., thermoplastics). This mill is also intended to be used without refrigerants and in an ordinary ambient atmosphere, though air cooling may be used. The rotor of the mill is designed to reduce friction between particles being milled, though it is not designed to operate at speeds approaching sonic.

Previously, where a particle size smaller than a certain mesh was desired, material exiting a mill could be passed through a screen or sieve of about that desired mesh to obtain material with a particle size smaller than that of the screen or sieve mesh. The remaining material (i.e., that which does not pass through the screen or sieve) could then be recycled into the feed material of that mill, or fed into a separate mill, for further size reduction. Such recycling creates inefficiencies in the milling operation insofar as the finer (i.e., smaller particle size) material tends to interfere with the milling of the larger particle size material. In addition, such use of a separate mill to further reduce particle size by a primary mechanism different than brittle fracture will decrease the throughput of the milled material. This results in increased expenditure (e.g., increased power consumption) to maintain the same degree of particle size reduction.

Another way in which particle size reduction is commonly carried out is wet milling, wherein horizontal serrated stone wheels and water dissipate the heat created during the grinding operation. However, with such a wet milling technique, water needs to be removed from the milled product. This plainly detracts from the efficiency of that technique.

Accordingly, there exists a need for an impact system which mills materials to fine particle sizes, such as to smaller than about 80 U.S. mesh (e.g., smaller than about 177 μm), without encountering the inefficiencies referred to above.

It is therefore an object of the invention to provide an ultra-high energy impact system which efficiently mills materials to fine particle sizes.

SUMMARY OF THE INVENTION

The present invention relates to an ultra-high energy impact system for reducing the particle size of materials to an average diameter as small as about 40 μm, preferably within the range of about 125 μm to about 250 μm. The system includes a cooling station for cooling the materials to a temperature within the range of about −40° F. to about −450° F., preferably from −110° F. to about −320° F.; a milling station for reducing the particle size of the cooled materials, including a rotor operating at a tip speed within the range of from about 500 to about 1500 FPS, preferably at least 950 FPS, and in flow communication with and downstream of the cooling station; and an atmosphere modifier for modifying the gaseous atmosphere within the milling station to be at a reduced pressure.

The present invention also relates to a process for milling materials to a particle size as small as about 40 µm, preferably within the range of about 125 µm to about 250 µm. The process includes cooling the materials to a reduced temperature within the range of from about −40° F. to about −450° F., preferably from −110° F. to −450° F., transporting the cooled materials to a milling station, and milling under a reduced pressure with a rotor which operates at a tip speed within the range of from about 500 to about 1500 FPS, preferably at least 950 FPS.

Preferably, the materials to be milled are tire rubber particles or thermoplastic particles and the cooling station reduces the temperature of those materials to a temperature of about −320° F. The atmosphere within the milling station is preferably at a reduced pressure generally less than 20, preferably less than 10, most preferably less than 2 inches of mercury absolute, and may comprise a light gas, such as hydrogen or helium.

BRIEF DESCRIPTION OF THE DRAWING

Other objects, features and advantages of the present invention will occur to those skilled in the art from the following description of a preferred embodiment and the accompanying drawing, which is a schematic diagram of an ultra-high energy impact system according to the present invention.

DETAILED DESCRIPTION OF THE INVENTION

The ultra-high energy impact system of the present invention mills materials in an economical and efficient manner. More specifically, the ultra-high energy impact system of this invention mills materials to a reduced particle size as small as about 40 µm average diameter, preferably within the range of from about 125 µm to about 250 µm average diameter and more preferably about 177 µm average diameter, at a reduced temperature and under a reduced pressure. Preferably, the milling station operates under cryogenic temperature conditions (such conditions being provided by the cooled materials to be milled), and under the reduced pressure atmosphere. The system and its operation are described in detail hereinafter.

With reference to the figure, materials to be milled are placed in a hopper 2. Suitable materials to be milled include, but are not limited to, metals (e.g., titanium, zinc and the like), plastics (e.g., thermoplastics such as polyacrylates, polycarbonates, polyethylenes, polypropylenes and the like, or thermosets such as epoxies), elastomers (e.g., rubbers) chemicals (e.g., sodium bicarbonate, manganese dioxide and the like), food items (e.g., nuts, dried fruits, citrus peels, cheeses, sugars and the like) and food-related items (e.g., spices), miscellaneous items (e.g., animal cartilage and animal organs) and the like. Particular examples include tire rubber, thermoplastics, thermosets and spices. Two preferred examples of materials to be milled are smaller than 4 U.S. mesh tire rubber particles and ⅛ inches polyethylene or polypropylene pellets.

A separate, independent feeder 2A, such as a precision type feeder which is capable of providing a substantially constant mass flow (e.g., ±2%) of feed material, may be used. The hopper 2 temporarily houses the materials to be milled and provides product to the feeder 2A. The feeder 2A controls the feed rate of the materials to the cooling station 3 and ultimately to the milling station 4 of the system. The feed rate is the amount of materials measured by weight introduced to the cooling station 3. The feed rate remains substantially constant throughout the system, and is controlled so as to permit an appropriate amount of materials to pass into the cooling station 3 for sufficient cooling and thereafter to pass into the milling station 4 for efficient size reduction thereof. In practice, the feed rate may be established by observing the horsepower drawn by the milling station 4.

From the hopper 2, the materials may be fed by conventional feeding techniques (such as a screw conveyor feeder 2A) to a cooling station 3, where the materials are cooled. In the cooling station 3, the temperature of the materials to be milled is reduced, thereby increasing brittleness and susceptibility to fracture. The temperature to which the materials are cooled in the cooling station 3 should be below the embrittlement or glass transition temperature of the material. For instance, with certain brittle materials (e.g., many thermosets such as epoxies) it may be sufficient to reduce the temperature thereof by air cooling, such as with air chillers, to a temperature slightly below ambient. With other materials (e.g., rubbers or thermoplastics), it may be more desirable to reduce the temperature of the materials to be milled to cryogenic levels.

In a preferred mode, the cooling station 3 is a cryogenic cooling station, in which materials to be milled are cooled to a cryogenic temperature within the range of from about −40° F. to about −450° F., with a temperature of about −320° F. being more preferred. ordinarily, a liquefied gas, such as liquid nitrogen, liquid helium, liquid oxygen, liquid argon or liquid carbon dioxide, will reduce the temperature to within that range. Solid carbon dioxide (also called dry ice) may also be employed. A preferred liquefied gas is liquid nitrogen, where the temperature reached may be as low as −320° F. Cold gaseous refrigerant may also be used.

In the cooling station 3, the materials to be milled may be cooled directly through a countercurrent heat exchanger or cocurrent heat exchange with the coolant or refrigerant, such as liquid nitrogen. The cooling station 3 includes a vent 6, from which used refrigerant (e.g., air or vaporized gas, such as vaporized nitrogen gas, vaporized helium gas or vaporized argon gas) is vented. From a safety aspect, the vented gas should be collected and removed from the operating area. The drawing illustrates an embodiment of the invention wherein the direct contact of the material with liquid refrigerant is countercurrent. The refrigerant is injected into cooling station 3 at a location 3A which assures that substantially no liquid or solid refrigerant is carried by the material into the mill which would cause vacuum maintenance difficulties. If cocurrent heat exchange is desired, the location of the refrigerant injection point into the cooling station would be closer to the material entrance point and the vent would be closer to the material exit point of the cooling station.

In either case, cooled materials are then fed, such as by gravity, to the milling station 4 through a gas tight rotary feedlock 5 or other suitable gas sealing device. The gas tight rotary feedlocks (5 and 7) are insulated and also seal the milling station 4 from the atmosphere so as to allow cooled material to enter (and exit after milling) but to prevent the loss of vacuum or escape of light gas and the introduction therein of ambient air. The insulation is important since the materials to be milled carry refrigeration from the cooling station 3 to the milling station 4. Because of the reduced pressure under which milling is carried out in accordance with the present invention, no additional refrigerant need be supplied to the milling station 4. Since the materials to be milled pass through the milling station 4 in a finite residence time, it is advantageous for the cooling station 3 to efficiently cool the materials prior to entering the milling station 4. And, as noted above, such precooling is accomplished through direct contact with refrigerant. This minimizes the loss of refrigeration as may occur if refrigeration were provided individually, for example by indirectly cooling the housing of the stations in the system. However, it is recognized that indirect heat exchange through interior walls of the cooling station may be desirable for reasons such as product reactivity with a refrigerant or very small entering particle sizes which results in particle "lofting" and subsequent venting.

Also, as noted above, the milling station 4 of the system operates under a reduced pressure atmosphere, such as a vacuum, which is maintained by a continuously operating vacuum pump (not shown). The vacuum pump reduces the pressure within the milling station to be less than 20, preferably less than 10, most preferably less than 2 inches of mercury absolute.

In addition, the gaseous atmosphere of the milling station 4 may comprise a light gas. An appropriate light gas to carry out the present invention is hydrogen or helium.

The light gas may be introduced to the milling station 4 by initially evacuating the milling station 4 through the use of a vacuum pump (not shown) and then charging the milling station 4 with the light gas from an appropriate source. For instance, a vacuum pump may draw a vacuum of about 28 inches of mercury to evacuate air therefrom. By using an appropriate valve so as not to break vacuum and introduce ambient conditions therein, a light gas may then be introduced thereto. Alternatively, the ambient air in the milling station 4 may first be displaced by the light gas, which may be introduced under a slight pressure (such as 5 inches of water) sufficient to so displace the ambient air.

Within the milling station 4 is a rotor (not shown). The rotor may be cast, machined, welded and milled or fabricated from a variety of materials including, but not limited to, stainless steel, nickel steel, titanium (particularly where a high strength to mass ratio is desirable), and other alloys known to be suitable for cryogenic service. Preferably, the rotor has an aerodynamic geometry to minimize windage. The rotor hub, which supports the hammers or impact surface, may have a disk- or flywheel-like shape, and is streamlined to minimize windage.

In operation, the rotor contacts the material with a sufficient force to provide an impact energy sufficient to fracture the material. For instance, the mill rotor operates with a tip speed within the range of from about 500 to about 1500 FPS, with a tip speed of about 950 FPS being preferred. A variation may use the rotor design to accelerate the product to the desired velocities against a fixed surface. Another variation would utilize rotor surfaces operating in opposite directions, the effective tip speed being approximately the sum of the tip speeds of the two rotors.

The rotor shatters or fractures the material in the milling station 4. The shattered or fractured material then passes through a retaining screen or slotted discharge plate (not shown) within the milling station 4 before exiting that station. The screen may have a conventional design or may be custom-designed depending on the application. The retaining screen or discharge plate also acts to enhance the residence time of the material within the milling station 4, thereby creating a greater opportunity for the material to contact the rotor and be reduced to the desired particle size. The ground material then passes, such as by gravity, through another gas tight rotary airlock 7 to a collection chamber (not shown) at atmospheric pressure.

It is recognized that there is energy in the form of heat that is imparted to each particle upon impact. The mill design may be such that the number of impacts may need to be limited to prevent the particles from exceeding the glass transition temperature.

In a preferred mode, tire rubber particles (having particle size of smaller than about 4 U.S. mesh) are cooled in the cooling station to a temperature below about −40° F. and desirably lower (such as to about −320° F.) using liquid nitrogen as the coolant. The cooled tire rubber particles are transported to the milling station, whose atmosphere has been modified to a reduced pressure (such as about 2 inches of mercury absolute). Within the milling station, the rotor operates at a tip speed as high as 1500 FPS, contact with which causes the cooled tire rubber particles to be reduced to a particle size having an average diameter preferably within the range of about 125 μm to about 250 μm, most preferably about 177 μm or smaller.

Specific features of the invention are shown in the figure for convenience only, as each feature may be combined with other features in accordance with the invention. Alternative embodiments will be recognized by those skilled in the art and are intended to be included within the scope of the claims.

What is claimed is:

1. An ultra-high energy impact system for reducing the particle size of materials to an average diameter as small as about 40 μm, comprising:
   (a) a cooling station for cooling said materials to a temperature within the range of from about −40° F. to about −450° F. by directly contacting said materials with refrigerant;
   (b) a milling station for reducing the particle size of said cooled materials and which does not require cooling by refrigerant, said milling station including a rotor which operates at a tip speed within the range of from about 500 to about 1500 feet per second; and
   (c) an atmosphere modifier for reducing the gaseous atmosphere within said milling station to a pressure less than 20 inches of mercury absolute.

2. The system according to claim 1, wherein said cooling station cools said materials to a temperature of about −320° F.

3. The system according to claim 1, wherein said atmosphere modifier reduces the pressure within said milling station to a pressure less than 10 inches of mercury absolute.

4. The system according to claim 1, wherein said atmosphere modifier reduces the pressure within said milling station to a pressure less than 2 inches of mercury absolute.

5. The system according to claim 1, wherein said atmosphere modifier additionally causes said milling station to have a light gas atmosphere, said light gas being selected from the group consisting of hydrogen, helium and mixtures thereof.

6. The system according to claim 1, wherein said materials are selected from the group consisting of tire rubber, thermoplastics, thermosets, and combinations thereof.

7. A process for reducing the particle size of material to an average diameter as small as about 40 μm, said process comprising the steps of:

(a) cooling said material to a temperature within the range of from about −40° F. to about −450° F. by directly contacting said material with refrigerant; and (b) milling the resulting cooled materials in a modified gaseous atmosphere having a pressure less than 20 inches of mercury absolute at a milling station which does not require cooling by refrigerant, employing a rotor operating at a tip speed within the range of from about 500 to about 1500 feet per second.

8. The process according to claim 7, wherein said gaseous atmosphere has a pressure less than 10 inches of mercury absolute.

9. The process according to claim 7 wherein said gaseous atmosphere has a pressure less than 2 inches of mercury absolute.

10. The process according to claim 7, wherein said gaseous atmosphere comprises a light gas.

* * * * *